Oct. 12, 1926.
J. A. McCASKELL
1,602,829
SCRAPING DEVICE
Filed Jan. 19, 1925     3 Sheets-Sheet 1
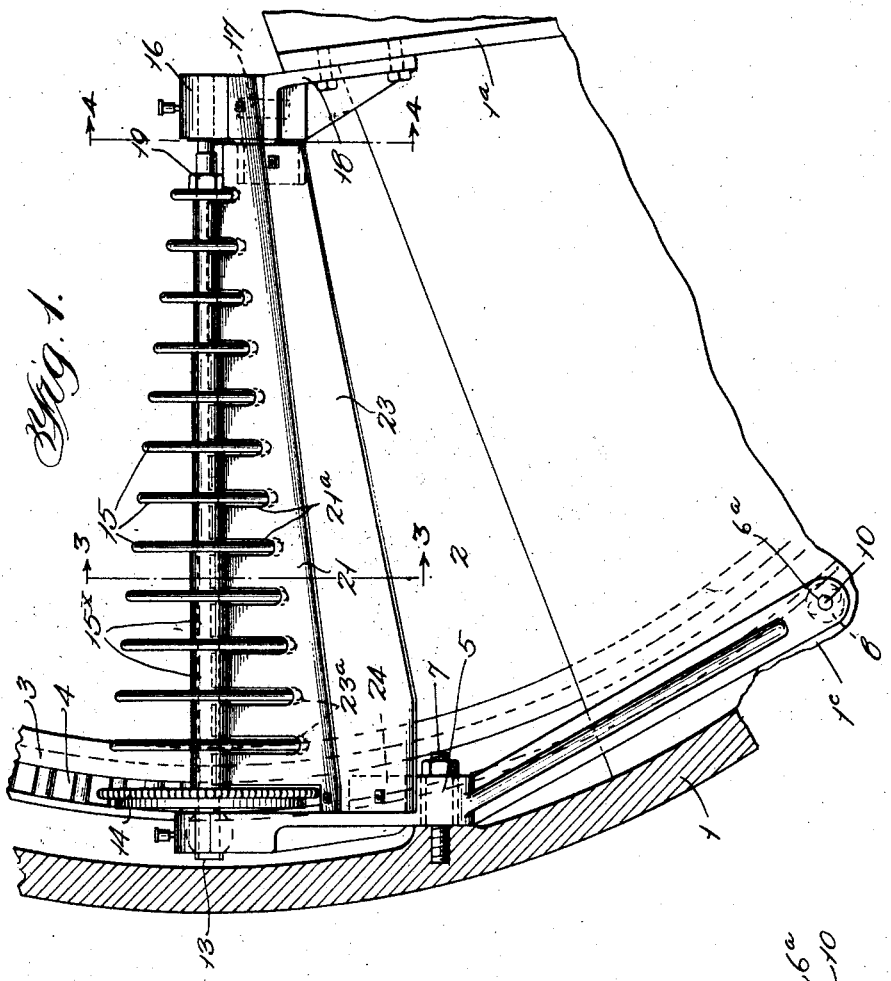
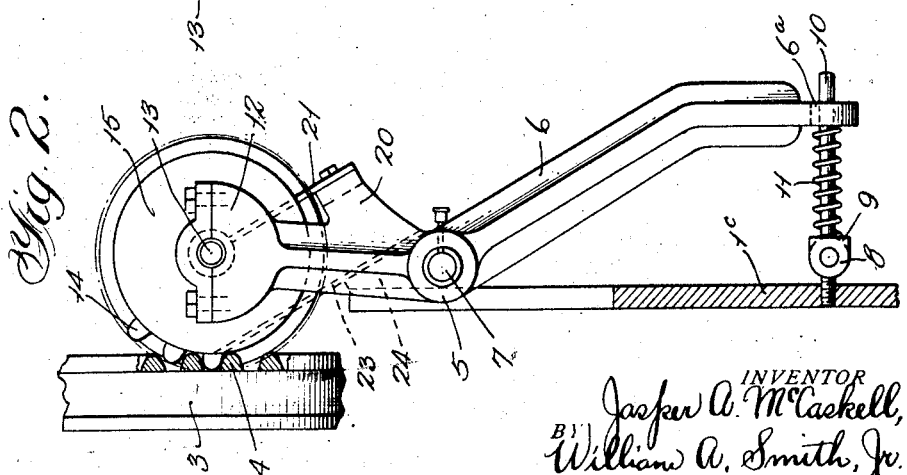

Oct. 12, 1926.
J. A. McCASKELL
1,602,829
SCRAPING DEVICE
Filed Jan. 19, 1925     3 Sheets-Sheet 2
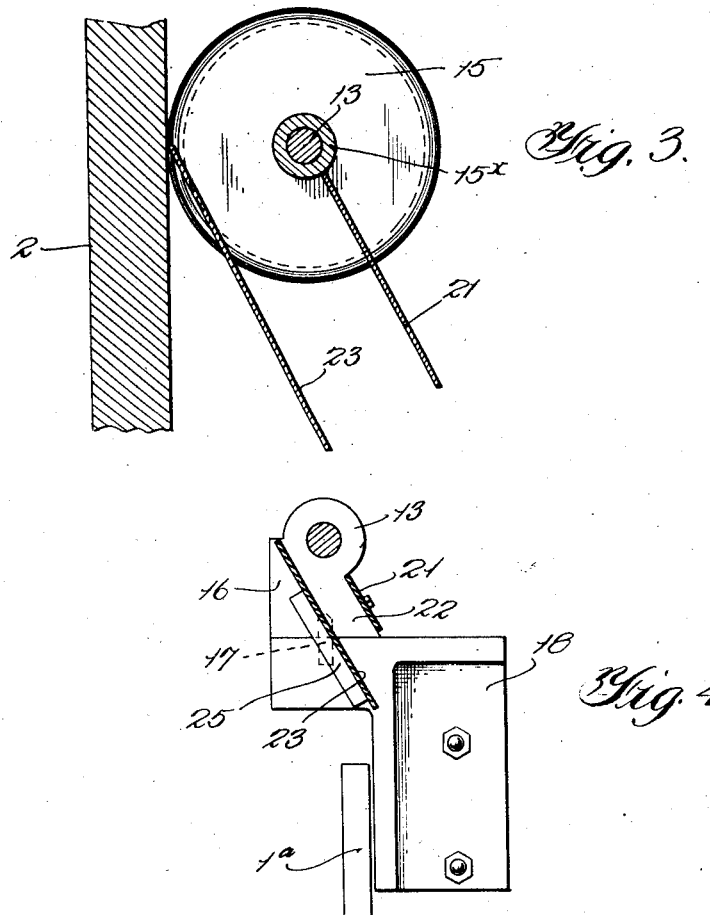

Oct. 12, 1926.

J. A. McCASKELL

SCRAPING DEVICE

Filed Jan. 19, 1925

INVENTOR
Jasper A. McCaskell,
BY William A. Smith, Jr.
ATTORNEY

Patented Oct. 12, 1926.

1,602,829

UNITED STATES PATENT OFFICE.

JASPER A. McCASKELL, OF SALT LAKE CITY, UTAH.

SCRAPING DEVICE.

Application filed January 19, 1925. Serial No. 3,543.

The present invention relates to a scraping device especially adapted for use in removing the accumulated filter cakes from filter presses, but the invention is of such character that it may well be adapted for use in connection with other apparatus. Heretofore various scraping devices have been used in connection with filter presses but these prior devices have been unsatisfactory, for various reasons.

A leading object of the present invention is the provision of a device of this character which will efficiently and completely remove the filter cake from the filter leaf, but which, at the same time, does not have its scraping plate in direct contact with the filter leaf.

A further object of the invention is the provision of a scraping device which has a rolling contact with the filter leaf, the rolling means on the scraper being driven from the movement of the filter leaf.

A further object of the invention is the provision of a scraping device so constructed that the filter cake cannot adhere to the rolling contact means, cannot clog or jam upon any part of the scraper so as to interfere with the operation of the latter.

A still further object of the invention is the provision of a scraping device which, with immaterial modifications, may be adapted for use in connection with filter presses of either the disk or drum type, and which will operate equally effectively with either type of filter press.

A still further object of the invention is the provision of mounting means for the scraping device which permit a resiliently yielding contact between the roller means of the scraper and the filter leaf, such mounting permitting the scraper to adapt itself to irregularities, and changes in the contour of the filter leaf and the accumulated filter cake.

With the above and other objects in view, my invention consists in parts, arrangements and combinations of parts, which I will hereinafter describe and claim.

In the drawings, forming part of this specification, and in which like reference numerals indicate like parts in the several views:

Figure 1 is a plan view of the present device, applied to a filter press of the disk type.

Fig. 2 is an end view of the same.

Fig. 3 is a section on the line 3—3 of Fig. 1.

Fig. 4 is a section on the line 4—4 of Fig. 1.

Figure 5:
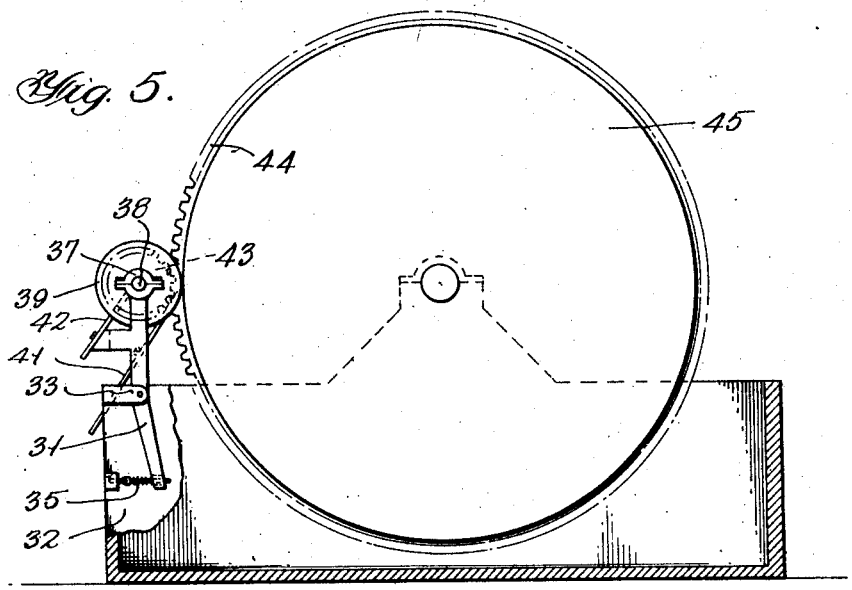
Fig. 5 is a plan view of the scraping device, applied to a filter press of the drum type.

Referring to the drawings, the numeral 1 indicates the stationary framework of the filter press. The numeral 1$^a$ indicates another part of the said stationary framework. Within the framework 1 the filter disks 2 are mounted, the disks having a rotary movement as is well known. At the periphery of the filter disk 2 a ring 3 is carried, the said ring carrying a toothed segment 4 thereon. Mounted upon the inner face of the framework 1 is a pivot 5, which may be screwed into or otherwise attached to the framework. Mounted upon this pivot is an arm 6, a bolt or other device 7 retaining the said arm in position upon the pivot. Spaced from the said pivot 5 and screwed or otherwise attached to a flanged portion 1$^c$ of the framework is a bearing 8, which has pivotally mounted thereon a block 9, which latter carries a pin 10. The end of the arm 6, adjacent the said pin 10, has an opening 6$^a$ therein through which the pin 10 passes. A coiled spring 11 surrounds the pin 10, one end of the spring bearing against the block 9, and the opposite end against the arm 6. At its opposite end the arm 6 carries a bearing block 12 within which is mounted the end of a shaft 13. Fixed to the shaft 13 is a gear wheel 14 which meshes with the gear segment 4 upon the ring 3 of the filter leaf, whereby the movement of the filter leaf is transmitted in turn to the shaft 13. Also affixed to the shaft 13 are a series of rollers 15, the said rollers decreasing in size during the length of the shaft. Between the rollers 15 bushings 15$^x$ are mounted, surrounding the shaft 13, the bushings thus spacing the rollers the required distance. At its opposite end the shaft 13 is mounted within a bearing block 16 which is in turn pivotally mounted, by means of the pivot 17 upon a member 18, which is in turn bolted or otherwise attached to the portion 1$^a$ of the stationary framework. A lock nut 19 is mounted upon the shaft 13 to retain the rollers thereon in position.

The arm 6 carries a lug portion 20, to which is bolted, or otherwise attached, a scraper plate 21, which will hereinafter be designated as the upper scraper. This scraper plate 21 has a series of slots 21$^a$ therein, of diminishing depth from left to right in Fig. 1, the said slots being adapted to receive the rollers 15, the front edge of the plate thus extending between the rollers and terminating adjacent the bushings 15$^x$, upon the shaft 13. At its opposite end, the upper scraper 21 is attached to a lug 22 carried by the bearing 16. A second, or lower scraper plate 23 is attached to a corresponding lug 24 upon the arm 6, and this lower scraper plate is likewise slotted at 23$^a$ to receive the rollers 15. The forward end of the lower scraper plate 23 terminates adjacent but not in direct contact with the surface of the filter leaf 2. The opposite end of the lower scraper plate 23 is attached to a lug 25 likewise carried by the bearing 16.

In the operation of the present device, the filter press being in operation, and a filter cake accumulated upon the filter leaf 2, the revolution of the filter leaf and the ring 3 at the periphery of the same will, through the gear segment 4 and the gear wheel 14 cause a rotation at corresponding speed of the shaft 13 and the rollers 15. The filter cake upon the leaf 2 will thereupon pass by the forward edge of the lower scraper 23 which will thereupon cut away the accumulated cake from the filter leaf, the accretions of filter cake being forced rearwardly upon the said scraper plate and being discharged in suitable manner at the rear of the plate. The upper scraper 21 will remove all cake that might have a tendency to adhere to the bushings 15, and all cake which might likewise have a tendency to clog and accumulate in the space between the rollers 15, it being noted that all such cake removed by the upper scraper 21 will remain below the plane of the scraper, and in turn pass rearwardly in the space between the lower scraper and the under surface of the upper scraper. The slots in the scrapers 21 and 23 will reasonably snugly fit the rollers 15 and prevent any adherence of the filter cake to the periphery or sides of the rollers, such filter cake being removed and passing with the remainder of the cake rearwardly in the space between the two scrapers. Since the scraper assembly is pivotally mounted at both ends, it can adapt itself to any changes in the surface of the filter leaf. For instance, when the filter cake is to be discharged from the leaf, it is customary to inject compressed air into the filter press for the purpose of blowing the leaf outwardly, thus assisting in the removal of the accumulated cake. Upon such outward blowing of the filter leaf the present scraper would be permitted to move with the leaf, so that at all times the lower scraper would be maintained at a predetermined distance from the surface of the filter leaf. The resilient mounting at the end of the arm 6, opposite to that end carrying the rollers and scraper assembly, assists in the conformation of the scraper assembly to the contour of the filter leaf, any outward movement of the forward end of the arm causing a compression of the spring at the rearward end, and upon release of the pressure at the forward end the spring would cause the forward end to resume its former position, still in contact with the filter leaf.

Figure 6:
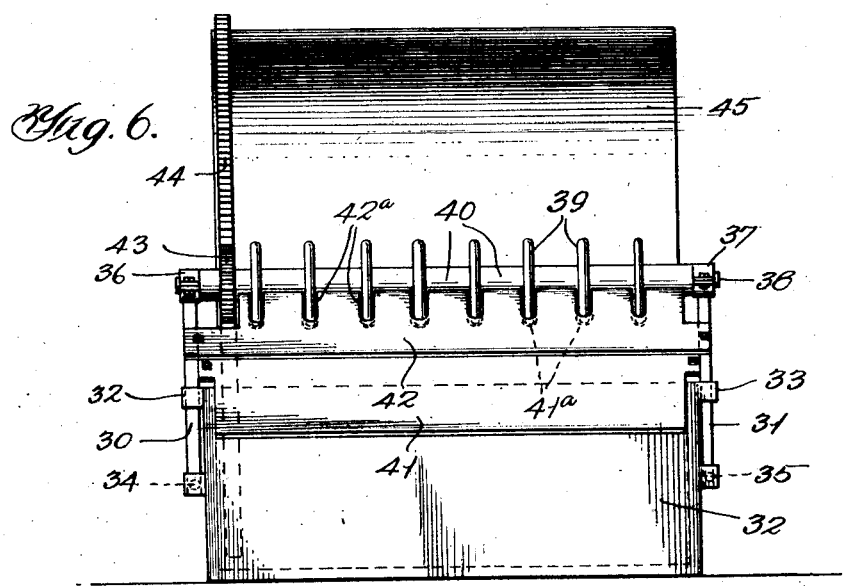
Fig. 6 is an end view of the same.

In Figs. 5 and 6 I have shown the present device attached to a filter press of the drum type. In this modification the construction of the scraper is substantially the same, with the exception that it is not necessary to form the rollers of diminishing diameter as in the case of the disk filter press heretofore described. In this modified form the arms 30 and 31 are pivotally mounted upon stationary framework 32 adjacent the filter. In this instance the arms 30 and 31 are substantially similar, are mounted upon pivots 32 and 33 respectively, and their rearward ends backed by resilient means 34, 35 respectively, and carry at their forward ends bearings 36, 37 in which are journaled the ends of a shaft 38. Upon the shaft 38 are a series of rollers 39, of equal diameter, and bushings 40 surround the shaft 38 and space the rollers. A lower scraper plate 41, and an upper scraper plate 42 are mounted upon the arms 30 and 31, in similar manner as described with reference to the device shown in Figs. 1 to 4 inclusive. The scraper plates 41 and 42 have slots 41$^a$ and 42$^a$ respectively therein, to receive the rollers 39. In this type of filter the rollers may receive movement by reason of their contact with the surface of the filter leaf, or the shaft 38 may carry a gear 43 which meshes with a gear segment 44 upon the periphery of the filter drum 45. This modified form of the device, for use in connection with filter presses of the drum type, operates in the same manner as the device used in connection with the presses of the disk type, hereinabove described. The scrapers 41 and 42 remove the accumulated cake in the manner described above, and the entire device functions in the identical manner as the device of the disk filter.

The present device in use upon either type of filter press will function efficiently to remove the cake, will, by reason of the fact that the scraper plate is kept from direct contact with the cloth of the filter leaf, prevent wear upon and damage to the filter cloth, and yet at the same time will remove the entire accumulated cake as efficiently as the former devices in which the scraper directly rested against the filter leaf, or in other cases where the cake was picked up by a roller and the cake then removed from the roller by a scraper. In the present device all of the cake is kept below the upper scraper, and passes to the rear, to a suitable discharge, in the space between the two scrapers. While the present device has been described in connection with filter presses, it is of course understood that it may be used in connection with other apparatus where accumulated substances are to be removed from a given portion of the apparatus, and the invention is not to be understood to be limited to use in connection with filter presses.

Having thus described the invention, what I claim as new and desire to secure by Letters Patent, is:—

1. A device for use in removing the accumulated filter cake from the movable surfaces of filter presses, comprising a scraper element, means for mounting the scraper element for movement toward and away from the movable surface of the filter press, yieldable means cooperable with the mounting means for urging the scraper element toward the movable surface of the filter press, a roller pivotally and positively connected to the means for mounting the scraper and riding on the movable surface to cause the scraper element to move toward and away from the movable surface in accordance with the irregularities of the movable surface, and means for positively driving the roller from the filter press.

2. A device for use in removing the accumulated filter cake from the movable surfaces of filter presses, comprising a scraper element, a swingable mounting for said scraper element, yieldable means cooperable with the mounting for urging the scraper element toward the movable surface of the filter press, a plurality of rollers rotatable on said mounting and riding on the movable surface, and means for cleaning accumulations from said rollers.

3. A device for use in removing the accumulated filter cake from the movable surfaces of filter presses, comprising a scraper element, a swingable mounting for said scraper element, yieldable means cooperable with the mounting for urging the scraper element toward the movable surface of the filter press, a plurality of rollers rotatable on said mounting and riding on the movable surface, means for cleaning accumulations from said rollers, and comprising a second scraper element located above the first and slotted to accommodate the rollers.

4. A device for use in removing the accumulated filter cake from the movable surfaces of filter presses, comprising a scraper element, a swingable mounting for said scraper element, yieldable means cooperable with the mounting for urging the scraper element toward the movable surface of the filter press, a plurality of rollers rotatable on said mounting and riding on the movable surface, means for cleaning accumulations from said rollers, and means for positively driving the rollers.

5. A device for removing accumulated substances from a movable surface mounted within a fixed framework, comprising two spaced arms mounted upon said framework; a scraper carried by said arms; a shaft likewise carried by said arms; a plurality of rollers upon said shaft, said scraper being slotted to receive a portion of said rollers; means for rotating said rollers from the movable surface; and means for holding the rollers in contact with the movable surface and in turn holding the scraper adjacent but out of direct contact with the said surface.

6. A device for removing accumulated substances from a movable surface, comprising a stationary frame work; two arms mounted upon said frame work; a lower scraper carried by said arms, said scraper having a series of slots therein; a second scraper above said lower scraper, said second scraper likewise having a series of slots therein; a shaft carried by said arms; a plurality of rollers mounted upon said shaft, said rollers being disposed within the slots in said scrapers; means whereby the movement of the movable surface is transmitted to said rollers; and means for holding the rollers in contact with the movable surface and positioning the said lower scraper adjacent but out of contact with the said surface.

7. A device for removing accumulated substances from a movable surface, comprising a fixed framework adjacent said movable surface; two arms pivotally mounted upon said fixed framework; a shaft journaled in said arms and extending between the same; a plurality of spaced rollers upon said shaft; a lower scraper carried by said arms, said scraper having a series of slots therein receiving a portion of said rollers; the forward end of said scraper being adjacent the movable surface; a second scraper above said lower scraper; said second scraper being carried by said arms, said second scraper having a series of slots therein to receive a portion of said rollers, said second scraper having its forward end extending between said rollers and adjacent the said shaft; means for imparting the movement of the movable surface to the said rollers; and means for holding the said rollers in contact with the said movable surface.

In testimony whereof I hereunto affix my signature.

JASPER A. McCASKELL.